Patented Aug. 12, 1947

2,425,349

UNITED STATES PATENT OFFICE 2,425,349

LAMINATED STRUCTURES

Herman E. Schroeder, Wilmington, Del., assignor to E. I. du Pont de Nemours & Company, Wilmington, Del., a corporation of Delaware No Drawing. Application September 28, 1943, Serial No. 504,144

7 Claims. (Cl. 154—136)

This invention relates to laminated structures.

In the construction of many articles the ultimate in strength and resistance to deformation can be secured only through lamination of various elements, by means of an adhesive, thus forming composite structures. This goal of ultimate strength has not heretofore been achieved in many instances because of the unavailability of suitable adhesives. Suitable examples are structures composed of natural and synthetic rubbers laminated to regenerated cellulose, steel, aluminum, etc.

It has now been found that, by blending cyclized rubber with thermosetting formaldehyde-mononuclear polyhydric phenol resols, there results a composition which can be used very advantageously as an adhesive in the manufacture of composite articles which are to be used at normal and at elevated temperatures.

The aforementioned cyclized rubber is a resin-like material obtained by the action of acid reagents on rubber at elevated temperatures. Variations in the type of acid reagent and in the time and temperature of reaction, result in a family of resins, offered in commerce under the trade names of Pliolite, Plioform, Thermoprene, etc.

It is an object of this invention, therefore, to provide laminated structures having excellent bond strength at normal and at elevated temperatures. It is another object to provide laminated structures comprising, as one element, natural or synthetic rubber. A further object is to provide structures composed of natural or synthetic rubber laminated to one or more other elements by means of an adhesive composition which is heat-convertible. A general advance in the art is contemplated.

The above and other objects are accomplished through the use of an adhesive composition consisting of a blend of a cyclized rubber with a heat-convertible formaldehyde - mononuclear polyhydric phenol resol.

In practicing this invention, the adhesive is applied between the elements to be laminated and the assembly is then cured, whereby the laminate elements are adhered to each other by a blend of a cyclized rubber and a heat-converted-in-situ formaldehyde-mononuclear polyhydric phenol resol.

The adhesives, used in the practice of this invention, are made generally by blending solutions in organic solvents of the cyclized rubber and the thermosetting formaldehyde-mononuclear polyhydric phenol resols. In place of using solutions in organic solvents, however, the cyclized rubber and the thermosetting aldehyde resols can be dispersed or emulsified in a water-containing medium and the dispersions then blended. If desired, however, the cyclized rubber and thermosetting aldehyde resol can be mixed in the dry state to produce a homogeneous blend.

The examples, which follow, illustrate the principles and diverse embodiments of this invention, including those contemplated for carrying out the same. In the examples, parts are by weight unless otherwise stated.

EXAMPLE I

A cyclized rubber was prepared in the following manner:

One thousand parts of smoked sheet rubber was masticated on a mill at 70° C. until it formed a smooth, continuous sheet. To the rubber on the mill was added 500 parts of a carbon black, sold under the trade name of "Micronex," and the mixture worked on the mill until the carbon black was homogeneously dispersed in the rubber. The blend was removed from the mill, cut into small pieces and dissolved in 4500 parts of xylene. To the solution was added 22.5 parts of concentrated sulfuric acid and 200 parts of phenol and the mixture heated with stirring for 16 hours at 115° C. At the end of this period, the acid was neutralized by adding, with stirring, 30 parts of ethanolamine. The mixture was then cooled to 25° C.

A resorcinol-formaldehyde resol was prepared by dissolving 24 parts of paraformaldehyde in 162 parts of normal butanol containing 0.24 part of potassium hydroxide and then adding to this solution, with stirring at 20° C., 30 parts of resorcinol, followed by 1 part of a 25% solution of phosphoric acid in ethanol.

Two hundred parts of the cyclized rubber, prepared as described above, was mixed with stirring with 88 parts of the resorcinol-formaldehyde resol solution, prepared as described above. To the blend was added, with stirring, 16 parts of a 10% solution of hexamethylenetetramine in chloroform and the resulting composition used as an adhesive in laminating rayon, nylon, and cotton to natural and synthetic rubbers as follows.

Weighed strips of square woven rayon, nylon and cotton fabrics were coated with the above adhesive, the coated strips heated for from 5 to 30 minutes at 70° C. to 80° C., cooled, and then weighed to determine the amount of adhesive deposited on the cloth. The coated strips were then pressed onto carcass stocks of natural rubber, GR-S[1] (Buna S[1]) and neoprene[2], which had been previously compounded for vulcanization and calendered onto a cotton fabric backing for reinforcement. The assemblage of carcass stock and cyclized rubber/thermosetting aldehyde resol coated fabric was placed in a mold and heated at 140° C. to 145° C. until the rubber was vulcanized and the adhesive had heat-converted. Thereafter the composite was removed from the mold, cooled, and bond strength determined by measuring the pull in pounds per linear inch required to separate the rubber from the adhesive coated fabric. The results are summarized in Table I below.

From the data in Tables I and II it is apparent that the adhesives, containing cyclized rubber and a thermosetting formaldehyde-mononuclear polyhydric phenol resol, are unexpectedly better in bond strength than either cyclized rubber alone or the thermosetting aldehyde resols alone. This is particularly true at elevated temperatures, for the cyclized rubber, which yields a bond strength of 25 pounds per linear inch at 25° C., is completely ineffective at 100° C., the bond strength having fallen to 1.2 pounds per linear inch. At such temperatures, and even up to 140° C. or higher, combinations, containing the thermosetting formaldehyde-mononuclear polyhydric

TABLE I

*Lamination of natural and synthetic rubbers to rayon, cotton, and nylon*

| Fabric | Adhesive Composition | Rubber Stock | Adhesive Loading, Per Cent | Bond Strength, lbs./in. at— | |
|---|---|---|---|---|---|
| | | | | 25° C. | 100° C. |
| Rayon | None | Rubber | | 2.0 | 1.5 |
| | | GR-S[1] | | 2.0 | 1.7 |
| | | Neoprene[2] | | 2.0 | 1.5 |
| | Cyclized rubber of Ex. 1 | Rubber | 15 | 10.0 | 1.0 |
| | Resorcinol-formaldehyde resol | do | 10 | 4.5 | 4.0 |
| | | Rubber | 20 | 45 | 38 |
| | Adhesive of Ex. 1 | GR-S[1] | 15 | 35 | 30 |
| | | Neoprene[2] | 18 | 31 | 15 |
| Nylon | None | Rubber | | 2.0 | 1.5 |
| | | GR-S[1] | | 2.0 | 2.0 |
| | Adhesive of Ex. 1 | Rubber | 20 | 35 | 26 |
| | | GR-S[1] | 19 | 49 | 32 |
| Cotton | | Rubber | | 18 | |
| | | GR-S[1] | | 17 | |
| | Adhesive of Ex. 1 | Rubber | 15 | 36 | 31 |
| | | GR-S[1] | 15 | 38 | 30 |

[1] A 75/25 butadiene/styrene interpolymer, prepared by procedures analogous to those of U. S. Patent 1,938,731.
[2] A 2-chloro-1,3-butadiene (chloroprene) polymer, prepared according to U. S. Patent 2,264,173.

EXAMPLE II

A cyclized rubber was prepared by masticating 100 parts of smoked sheet rubber on a mill at 70° C. until it formed a smooth, continuous sheet. The rubber was removed from the mill, cut into small pieces and dissolved in 900 parts of xylene. To this rubber solution was added a mixture of 2.25 parts of concentrated sulfuric acid and 15 parts of phenol and the mixture heated for 13 hours at 100° C. to 115° C. with stirring, after which there was added 3 parts of ethanolamine, and the mixture cooled to 25° C.

An adhesive composition, prepared by blending the above cyclized rubber with the resorcinol-formaldehyde resol of Example I, was evaluated in the bonding of natural rubber to rayon as described in Example I. The composition of the blend and the bond strength obtained, in comparison with cyclized rubber alone and with the resorcinol-formaldehyde resol alone, are listed in Table II.

phenol resols, retain to a high degree all of their original bonding effectiveness.

EXAMPLE III

A series of cyclized rubbers was prepared from neoprene and GR-S.[1]

A. Fifty parts of GR-S[1] was dissolved in 450 parts of xylene and to this solution was added 10 parts of meta-cresol and 2.3 parts of concentrated sulfuric acid and the mixture heated, with stirring, for 48 hours at 120° C.

B. One hundred parts of milled neoprene was dissolved in 100 parts of xylene and to this solution was added 2.25 parts of concentrated sulfuric acid, 1 part of boric acid, and 15 parts of meta-cresol and the mixture heated, with stirring, for 10 hours at 110° C. to 120° C.

A series of adhesive compositions, comprising blends of the cyclized rubbers prepared as described above with the aldehyde resols listed below, were prepared and evaluated in the bonding of natural rubber, GR-S,[1] and neoprene to nylon

TABLE II

*Lamination of natural rubber to rayon*

| Rubber Compound | Parts | Thermosetting Resol | Parts | Catalyst | Parts | Loading on Fabric, per cent by Weight | Bond Strength lbs./in. at— | |
|---|---|---|---|---|---|---|---|---|
| | | | | | | | 25° C. | 100° C. |
| Rubber | | | | None | | 10 | 2.0 | 1.5 |
| None | | Resorcinol/formaldehyde | 10 | NaOH | 0.05 | 15 | 4.5 | 4.0 |
| Cyclized Rubber | | do | | | | 15 | 25.0 | 1.2 |
| Do | 20 | do | | Hexa[1] | 1.0 | 10 | 39 | .31 |

[1] Hexamethylenetetramine.

and rayon, as described in Example I. The results are shown in Table III.

(1) To 30 parts of a solution in xylene of cyclized rubber (A) were added 3 parts of a 50% solution of a resorcinol-formaldehyde resol in normal butanol, prepared as described in Example I, and 1.5 parts of a 10% solution of hexamethylenetetramine in chloroform.

(2) To 30 parts of the solution in xylene of cyclized rubber (A) were added 3 parts of a 10% solution of hexamethylenetetramine in chloroform and 6 parts of a 25% solution of a resorcinol-formaldehyde resol, prepared by dissolving 40 parts of paraformaldehyde in 270 parts of normal butanol containing 0.4 part of potassium hydroxide, adding 50 parts of resorcinol, and allowing the mixture to stand at 25° C. for 24 hours.

(3) To 24 parts of a 10% solution in xylene of cyclized rubber (B) were added 0.1 part of magnesium oxide, 5 parts of a 25% solution of a resorcinol-formaldehyde resol in normal butanol, prepared as in Example I, and 1.25 parts of a 10% solution of hexamethylenetetramine in chloroform.

blend used as an adhesive in laminating nylon to natural rubber, according to the procedure described in Example I. The nylon fabric, containing approximately 14% adhesive, is found to exhibit an adhesion at 25° C. of 29 lbs./in. to the rubber carcass stock.

The cyclized rubbers, used in the practice of this invention, may be prepared in any one of several ways and their compositions and properties may vary somewhat, but, however prepared, they are thermoplastic and have less chemical unsaturation than natural rubber. They correspond substantially to the empirical formula of $(C_5H_8)_x$ and appear to be condensation derivatives of rubber. The term "condensation" is used in the same sense that is employed by Cohen (page 245 of his "Organic Chemistry for Advanced Students," 1909 edition), namely:

"Condensation may, then, be defined as the union of two or more organic molecules or parts of the same molecule with or without the elimination of component elements, in which the new combination is effected between carbon atoms."

In the condensation, various reagents may be employed for converting rubber into the cyclized

TABLE III

*Rubber-fabric laminations bonded with thermo-setting resol/cyclized rubber compositions*

| Fabric | Adhesive Composition | | | | | | Rubber Stock | Loading on Fabric, per cent by Weight | Bond Strength lbs./in. at— | |
|---|---|---|---|---|---|---|---|---|---|---|
| | Cyclized Rubber | Parts | Thermosetting Resol | Parts | Catalyst | Parts | | | 25° C. | 100° C. |
| Rayon | Cyclized GR-S [1] | | None | | | | Rubber | 15 | 6.5 | 1.0 |
| | | | | | | | GR-S [1] | 15 | 9.0 | 1.0 |
| | | | | | | | Neoprene | 15 | 4.0 | 1.0 |
| | | 20 | Resorcinol/formaldehyde | 10 | Hexa [2] | 1.0 | Rubber | 16 | 30 | 20 |
| | | | | | | | GR-S [1] | 17 | 36 | 30 |
| | | | | | | | Neoprene | 18 | 31 | 17 |
| Nylon | do | | None | | | | Rubber | 15 | 7.0 | 1.5 |
| | | | | | | | GR-S [1] | | 9.3 | 1.8 |
| | | 20 | Resorcinol/formaldehyde | 10 | Hexa [2] | 2.0 | Rubber | 10 | 27 | 18 |
| | | | | | | | GR-S [1] | 20 | 72 | 28 |
| Rayon | Cyclized Neoprene | | None | | | | Rubber | 10 | 8.0 | 2.0 |
| | | | | | | | GR-S [1] | 12 | 10.0 | 3.1 |
| | | 20 | Resorcinol/formaldehyde | 10 | Hexa [2] | 1.0 | Rubber | 20 | 26 | 17 |
| | | | | | | | GR-S [1] | 30 | 33 | 16 |

[1] A 75/25 butadiene/styrene interpolymer, prepared by procedures analogous to those of U. S. Patent 1,938,731.
[2] Hexamethylenetetramine.

EXAMPLE IV

Following the procedure described in U. S. Patent 1,668,236, there was added to 100 parts of rubber on a mill 2.5 parts of concentrated sulfuric acid mixed with 2.5 parts of a carbon black, sold under the trade name of "Micronex," and the mixture worked on the rubber mill until the carbon black was homogeneously dispersed in the rubber. The blend was removed from the mill and heated in an oven for 20 hours at 130° C. The resulting product was somewhat tacky and resembled very lightly vulcanized rubber. The cyclized rubber, thus obtained, was cut into small strips and dissolved in xylene to form a solution containing 15% solids by weight.

A resorcinol-formaldehyde resol was prepared by dissolving 24 parts of paraformaldehyde in 162 parts of normal butanol at about 90° C., cooling, and then adding to this solution, with stirring at 20° C., 30 parts of resorcinol.

Forty-two parts of the cyclized rubber solution, prepared as described above, was mixed, with stirring, with 13.5 parts of the resorcinol-formaldehyde resol solution, prepared as above described. To this mixture was added, with stirring, 7 parts of a 10% solution of hexamethylenetetramine in chloroform and the resulting rubber. In one mode of preparation, a solution (the reaction with the rubber is advantageously carried out in solution) of the rubber in benzene or xylene is boiled for an hour or two and then, while continuing the boiling under a reflux condenser, up to 10% (based on the amount of rubber) of a conversion agent, such as stannic chloride or sulfuric acid, is added. The heating is then continued for perhaps several hours, or until the desired reaction has taken place. The condensation derivative of the rubber is isolated by pouring the reaction mass into water, acetone, alcohol (methyl, ethyl, etc.) and the like.

Tin tetrachloride apparently reacts with the rubber to form a tin chloride addition product of rubber (or cyclized rubber) which probably has the formula $(C_5H_8)_x SnCl_4$. The tin and chlorine split off upon drowning the resulting product, leaving the cyclized rubber hydrocarbon. In this procedure, aluminum chloride, ferric chloride, chromic chloride, or another halide of an amphoteric metal may replace the tin chloride.

The deformation point (point at which plastic flow is detectable) in any one case depends upon the type of rubber treated, the amount and type of catalyst used, and the time and temperature employed in the conversion. By varying these factors, products, varying in deformation point from about 30° C. to about 150° C., can be obtained. The adhesives, used in the preparation of the laminated products of this invention, are generally made using cyclized rubbers in the lower deformation range.

The cyclized rubbers, made by treating a natural or a synthetic rubber in solution with sulfuric acid and a phenol as described in the examples, constitute the preferred products for use in the practice of this invention. Other useful products are made by the procedure described in U. S. Patents 1,605,180, 1,668,235, 1,668,236, 1,668,237, 1,745,926, 1,782,140 1,747,188, 1,846,247, 1,852,294, 1,852,295, 1,852,345, 1,852,346, 1,853,334, 2,050,209, and 2,052,931. Of these products, the preferred cyclized rubbers are those which are resilient and elastic like soft vulcanized rubber. These products are, in general, obtained by reacting 2 to 3 parts of concentrated sulfuric acid or 2 to 5 parts of a phenol sulfonic acid with the rubber.

The examples have illustrated the use of natural rubber and such synthetic rubbers as GR-S and neoprene in the preparation of cyclized rubbers. In place of these materials, such naturally occurring products as gutta-percha and balata as well as such rubber-like materials as the polymers of butadiene with other polymerizable organic compounds containing olefinic unsaturation, can be used, exemplified by the polymer obtained by polymerizing 2-chlorobutadiene-1,3 with 2-methyl butadiene, butadiene with acrylonitrile, etc.

The thermosetting resols can be made from various mononuclear polyhydric phenols such as hydroquinone, catechol, pyrogallol, phloroglucinol, orcinol, and the like. Polyhydric phenols and particularly the dihydric mononuclear phenols are preferred because thermosetting aldehyde resols made therewith yield, with cyclized rubber, adhesives showing particularly good bond strengths at elevated temperatures.

In place of formaldehyde there can be used other aldehydes, and materials which under the conditions of reaction liberate formaldehyde, in the preparation of the thermosetting aldehyde resols. Examples of such materials are paraformaldehyde, hexamethylenetetramine, 1,3,5-trioxane, acetaldehyde, butyraldehyde, chloral, furfural, benzaldehyde, and the like.

This invention makes possible the production of rigid, semi-rigid, and flexible structures composed of a plurality of elements, said elements being all alike, or some alike and some unlike. Particularly useful structures are those comprising natural rubber or a synthetic rubber laminated either to a textile material, such as a cellulosic material or a nylon material, or to a metal. Equally useful are those rigid structures made by laminating wood to wood, a textile fabric to wood or to metal, natural rubber or a synthetic rubber to wood or to metals, a metal to a metal, or a flexible nonwoven sheet material to itself or to natural or synthetic rubber, wood, metal, etc.

By the process of this invention composite structures, having exceptionally high bond strengths at normal and at elevated temperatures are obtained and such structures can comprise as one of the elements natural rubber or a solid polymeric material such as the product obtained by polymerizing one or more polymerizable organic compounds. Examples of such compounds are ethylene, propylene, isobutylene, butadiene-1,3, vinyl furane, isoprene, dimethyl butadiene-1,3, 2-chlorobutadiene-1,3, 2-fluorobutadiene-1,3, styrene, acrylic and methacrylic acids, their esters, amides and nitriles, e. g., methyl, ethyl, butyl, octyl, and dodecyl acrylates and methacrylates, acrylamide and methacrylamide, and acrylonitrile and methacrylonitrile, etc., methyl vinyl ketone, vinylidene chloride, tetrafluoroethylene, vinyl chloride, vinyl acetate, vinyl trimethyl acetate, vinyl chloroacetate, etc.

Laminated structures comprising as one element either of the rubber-like products obtained by polymerizing either 2-chlorobutadiene-1,3 or by polymerizing butadiene-1,3 with either styrene or acrylonitrile or methacrylonitrile constitute a particularly useful embodiment of this invention.

In place of a cellulosic material there can be used as one of the elements of the composite structures of this invention such other textile materials as silk and textiles based on casein fibers, polyacrylonitrile fibers, polyvinyl chloride/polyvinyl acetate fibers, polyvinylidene chloride fibers, hydrolyzed polyethylene/polyvinyl acetate fibers, etc.

In structures designed to withstand severe temperature conditions, the adhesive composition comprises from 25 to 90% of cyclized rubber by weight (based on total solids) and the thermosetting resol is the reaction product of formaldehyde with a mononuclear polyhydric phenol, e. g., the reaction product of formaldehyde with either resorcinol, pyrogallol, or phloroglucinol. Percentages outside this range, as from 5 to 95% can be used, however, especially in applications where the structure is not designed for use under drastic temperature and flexing conditions.

In the fabrication of structures in which one of the elements is nylon or rayon and the other element is either natural rubber or a synthetic rubber, the best results are generally obtained with an adhesive comprising from about 60 to about 80 parts of cyclized rubber and about 40 to about 20 parts of a thermosetting formaldehyde mononuclear polyhydric phenol resol.

By the term "rubber-like materials" as employed herein and in the claims forming a part thereof, it is intended to include the natural rubbers, gutta percha and balata, as well as synthetic rubber-like materials.

The subject matter of this application is largely disclosed in my copending application Serial No. 501,657, filed September 9, 1943, for "Heat-convertible compositions." In such copending application, the adhesives, which are employed in the practice of this invention, are claimed as new compositions of matter.

I claim:

1. A laminated structure comprising a rubbery polymer and a textile material adhered to each other by a blend of a cyclized rubber, obtained by heating a solution of a member of the group consisting of natural rubber, rubbery polymers of 2-chlorobutadiene-1,3 and rubbery polymers of butadiene-1,3 with a small proportion of sulfuric acid and a small proportion of a phenol, and a heat-converted-in-situ resol which is the reaction product of formaldehyde and resorcinol only, the cyclized rubber constituting from 25% to 90% by weight of the total solids of the blend.

2. A laminated structure comprising a rubbery polymer and a textile material adhered to each other by a blend of a cyclized rubber, obtained by heating a solution of natural rubber with a small proportion of sulfuric acid and a small proportion of a phenol, and a heat-converted-in-situ resol which is the reaction product of formaldehyde and resorcinol only, the cyclized rubber constituting from 25% to 90% by weight of the total solids of the blend.

3. A laminated structure comprising a rubbery polymer and a textile material adhered to each other by a blend of a cyclized rubber, obtained by heating a solution of a rubbery polymer of 2-chlorobutadiene-1,3 with a small proportion of sulfuric acid and a small proportion of a phenol, and a heat-converted-in-situ resol which is the reaction product of formaldehyde and resorcinol only, the cyclized rubber constituting from 25% to 90% by weight of the total solids of the blend.

4. A laminated structure comprising a rubbery polymer and a textile material adhered to each other by a blend of a cyclized rubber, obtained by heating a solution of a rubbery polymer of butadiene-1,3 with a small proportion of sulfuric acid and a small proportion of a phenol, and a heat-converted-in-situ resol which is the reaction product of formaldehyde and resorcinol only, the cyclized rubber constituting from 25% to 90% by weight of the total solids of the blend.

5. A laminated structure comprising a rubbery polymer and a cellulosic material adhered to each other by a blend of a cyclized rubber, obtained by heating a solution of a member of the group consisting of natural rubber, rubbery polymers of 2-chlorobutadiene-1,3 and rubbery polymers of butadiene-1,3 with a small proportion of sulfuric acid and a small proportion of a phenol, and a heat-converted-in-situ resol which is the reaction product of formaldehyde and resorcinol only, the cyclized rubber constituting from 25% to 90% by weight of the total solids of the blend.

6. A laminated structure comprising a rubbery polymer and a rayon material adhered to each other by a blend of a cyclized rubber, obtained by heating a solution of a member of the group consisting of natural rubber, rubbery polymers of 2-chlorobutadiene-1,3 and rubbery polymers of butadiene-1,3 with a small proportion of sulfuric acid and a small proportion of a phenol, and a heat-converted-in-situ resol which is the reaction product of formaldehyde and resorcinol only, the cyclized rubber constituting from 25% to 90% by weight of the total solids of the blend.

7. A laminated structure comprising a rubbery polymer and a nylon material adhered to each other by a blend of a cyclized rubber, obtained by heating a solution of a member of the group consisting of natural rubber, rubbery polymers of 2-chlorobutadiene-1,3 and rubbery polymers of butadiene-1,3 with a small proportion of sulfuric acid and a small proportion of a phenol, and a heat-converted-in-situ resol which is the reaction product of formaldehyde and resorcinol only, the cyclized rubber constituting from 25% to 90% by weight of the total solids of the blend.

HERMAN E. SCHROEDER.

REFERENCES CITED

The following references are of record in the file of this patent:

UNITED STATES PATENTS

| Number | Name | Date |
| --- | --- | --- |
| 2,343,551 | Harkins | Mar. 7, 1944 |
| 2,128,229 | Charch | Aug. 30, 1938 |
| 1,970,835 | Benner | Aug. 21, 1939 |
| 1,946,932 | Courtney | Feb. 13, 1939 |
| 2,291,208 | Brown | July 28, 1942 |
| 2,211,951 | Hershberger | Aug. 20, 1940 |